United States Patent [19]

Marioni et al.

[11] Patent Number: 5,131,821
[45] Date of Patent: Jul. 21, 1992

[54] AQUARIUM PUMP WITH REVERSIBLE AND ADJUSTABLE FLOWS

[75] Inventors: Elio Marioni; Vittorio Cavalcante, both of Dueville, Italy

[73] Assignee: Askoll S.p.A., Dueville, Italy

[21] Appl. No.: 558,367

[22] Filed: Jul. 27, 1990

[30] Foreign Application Priority Data

Aug. 2, 1989 [IT]  Italy ................ 41675 A/89

[51] Int. Cl.⁵ ................ F04B 17/00; F04B 35/04
[52] U.S. Cl. ................ 417/423.3; 210/169; 210/416.2
[58] Field of Search ................ 210/169, 416.2; 417/291, 423.3; 119/5

[56] References Cited

U.S. PATENT DOCUMENTS

| | | | |
|---|---|---|---|
| 3,698,832 | 10/1972 | Price | 415/148 |
| 4,283,645 | 8/1981 | Hofmann | 210/169 |
| 4,490,250 | 12/1984 | Dockery | 210/169 |
| 4,559,136 | 12/1985 | Dockery | 210/169 |
| 4,802,980 | 2/1989 | Gilkey et al. | 210/169 |
| 4,985,181 | 1/1991 | Strada et al. | 210/169 |
| 5,006,238 | 4/1991 | Tominaga | 210/169 |
| 5,011,600 | 4/1991 | Mowka et al. | 210/169 |

FOREIGN PATENT DOCUMENTS 1453773 2/1964 Fed. Rep. of Germany.
1940507 8/1969 Fed. Rep. of Germany.
3152631 9/1981 Fed. Rep. of Germany.

Primary Examiner—Peter Hruskoci
Assistant Examiner—Robert James Popovics
Attorney, Agent, or Firm—Guido Modiano; Albert Josif

[57] ABSTRACT

The pump comprises a cylindrical container for an internal element, associated with a known permanent-magnet and defining two chambers, a lower suction chamber and an upper chamber for the impeller. The chambers have respectively a suction inlet and a discharge outlet. The internal element, actuated by a lever, is coupled to the container so as to be rotatable between two positions in which the suction inlet uncovers thereon respectively an axial port and a radial port while the discharge outlet uncovers respectively a radial port and the axial port. An element for throttling the axial port in its operation as suction inlet is rotatably coupled to the container below the suction chamber and is actuated by a second lever.

10 Claims, 4 Drawing Sheets

AQUARIUM PUMP WITH REVERSIBLE AND ADJUSTABLE FLOWS

BACKGROUND OF THE INVENTION

The present invention relates to an aquarium pump with reversible and adjustable flows.

A usual setup of aquariums provides the installation of a so-called "sand filter".

Said filter is constituted by an interspace which is defined between the base of the aquarium and the sand constituting the bottom, which is arranged above it; said interspace communicates with said sand by virtue of the presence of a plurality of openings defined on the resting plane, which is preferably made of continuous modules made of plastics or other material which does not deteriorate in the course of time.

Said interspace is connected by means of a suction tube to a recirculation pump which thus sucks water in from the bottom, the water is then filtered through the sand, and recirculated into the upper part of the aquarium.

Periodic cleaning operations, suitable for avoiding clogging of the filtering parts, are required for the good operation of the filter.

In order to perform said periodic cleaning operations it is necessary to disconnect the recirculation pump and make it pump water in reverse through the suction tube into the interspace and then through the sand.

However, this operation is not very easy, since it is necessary to act on the hydraulic connections of the aquarium, which are usually constituted by rubber tubes and couplings made of plastics.

SUMMARY OF THE INVENTION

The aim of the present invention is to provide an aquarium pump which can reverse the flows between the suction and the discharge.

A consequent object of the invention is to provide an aquarium pump which, when applied to a "sand filter", can reverse the flow in the filter so as to clean said filter without requiring modifications of the hydraulic connections.

Another important object of the invention is to provide a pump which also allows to adjust the flow-rate according to the filter and/or the aquarium in which it is installed.

Another object of the invention is to provide a pump, having flow reversal and flow-rate adjustment devices which are easy and rapid to operate.

A further object of the invention is to provide a pump composed of elements which are easy and rapid to assembly.

Still another object of the invention is to provide a pump which is composed of elements which can be manufactured with the method of injection-molding thermoplastic materials and can therefore be produced at low cost in a large number of units.

A not least object of the invention is to provide a pump which can be used for "sand filters" and as a recirculation pump and also as a pump to be applied to any type of filter.

This aim, these objects and others which will become apparent hereinafter are achieved by an aquarium pump with reversible and adjustable flows and having a permanent-magnet motor unit, characterized in that it comprises a substantially cylindrical container for an internal element, said container being associated with said permanent-magnet motor unit, said internal element defining a lower suction chamber and an upper impeller chamber, said chambers having respectively a suction inlet and a discharge outlet, said element, actuated by first lever means, being coupled to said container so as to be rotatable between two positions in which the suction inlet uncovers thereon respectively an axial port and a radial port and the discharge outlet uncovers respectively a radial port and said axial port, an element for throttling said axial port in its operation as suction inlet being rotatably coupled to the container below said suction chamber and being actuated by second lever means.

BRIEF DESCRIPTION OF THE DRAWINGS

Further characteristics and advantages will become apparent from the detailed description of a preferred embodiment of the invention, shown in the accompanying illustrative, non-limitative drawings, wherein.

DESCRIPTION OF THE PREFERRED EMBODIMENTS

Figure 1:
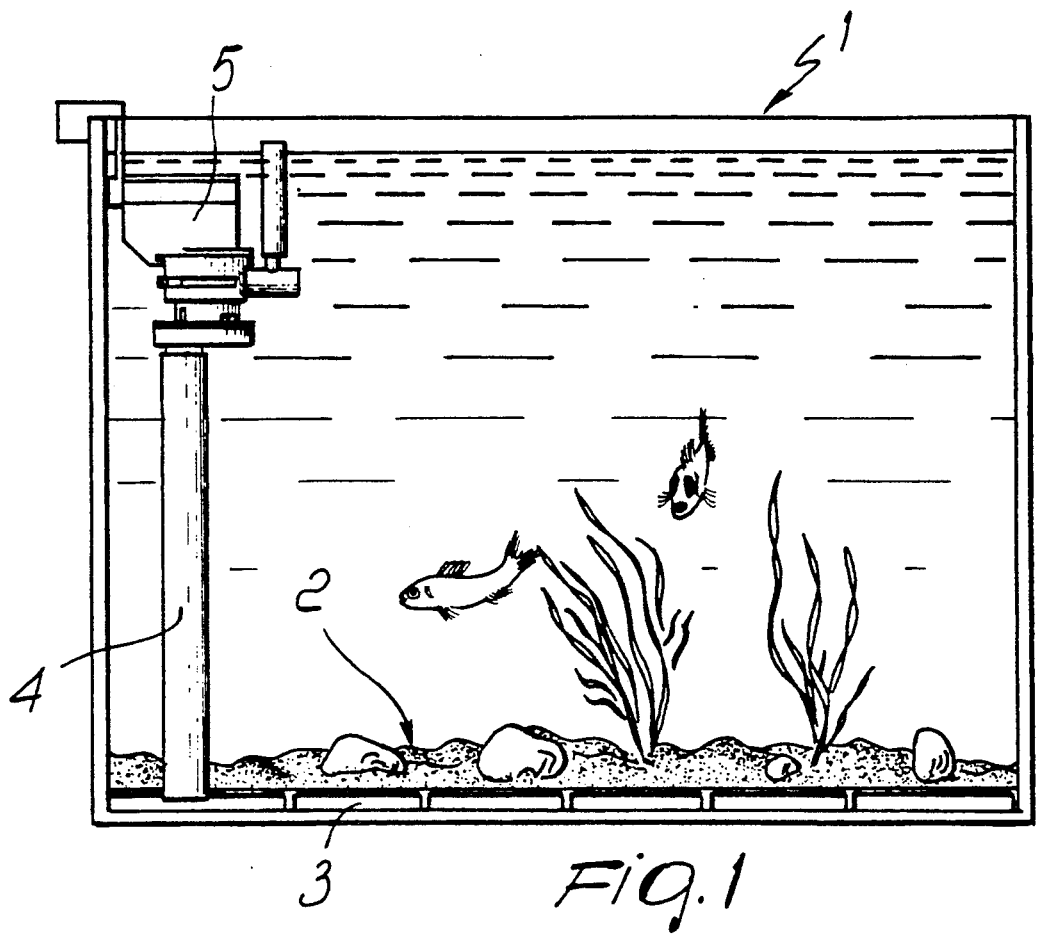
FIG. 1 is a sectional view of an aquarium in which a sand filter, provided with the pump according to the invention, is installed.
Figure 2:
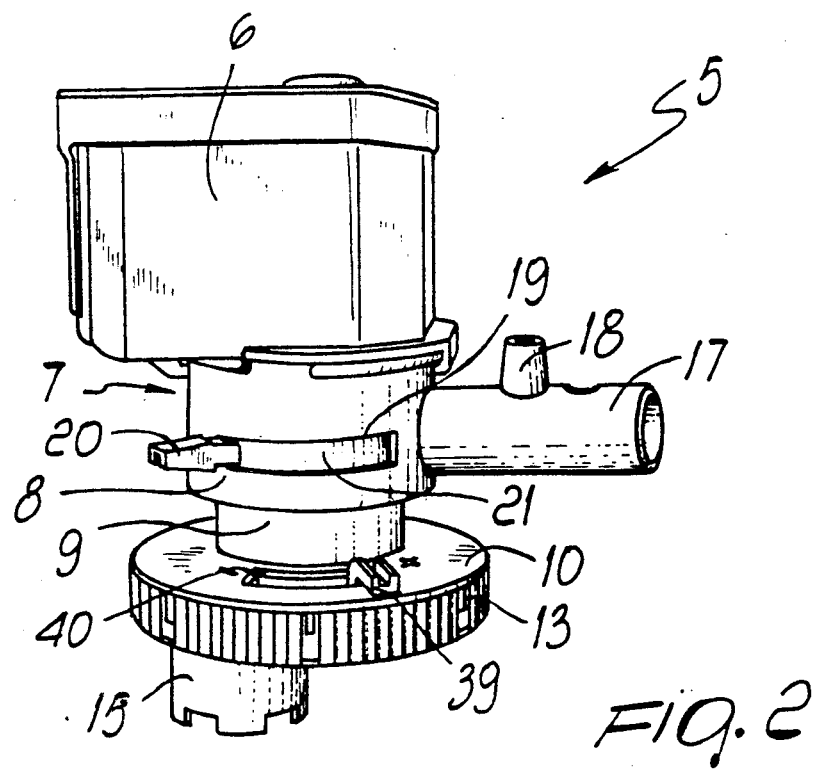
FIG. 2 is a perspective view of the pump according to the invention.
Figure 3:
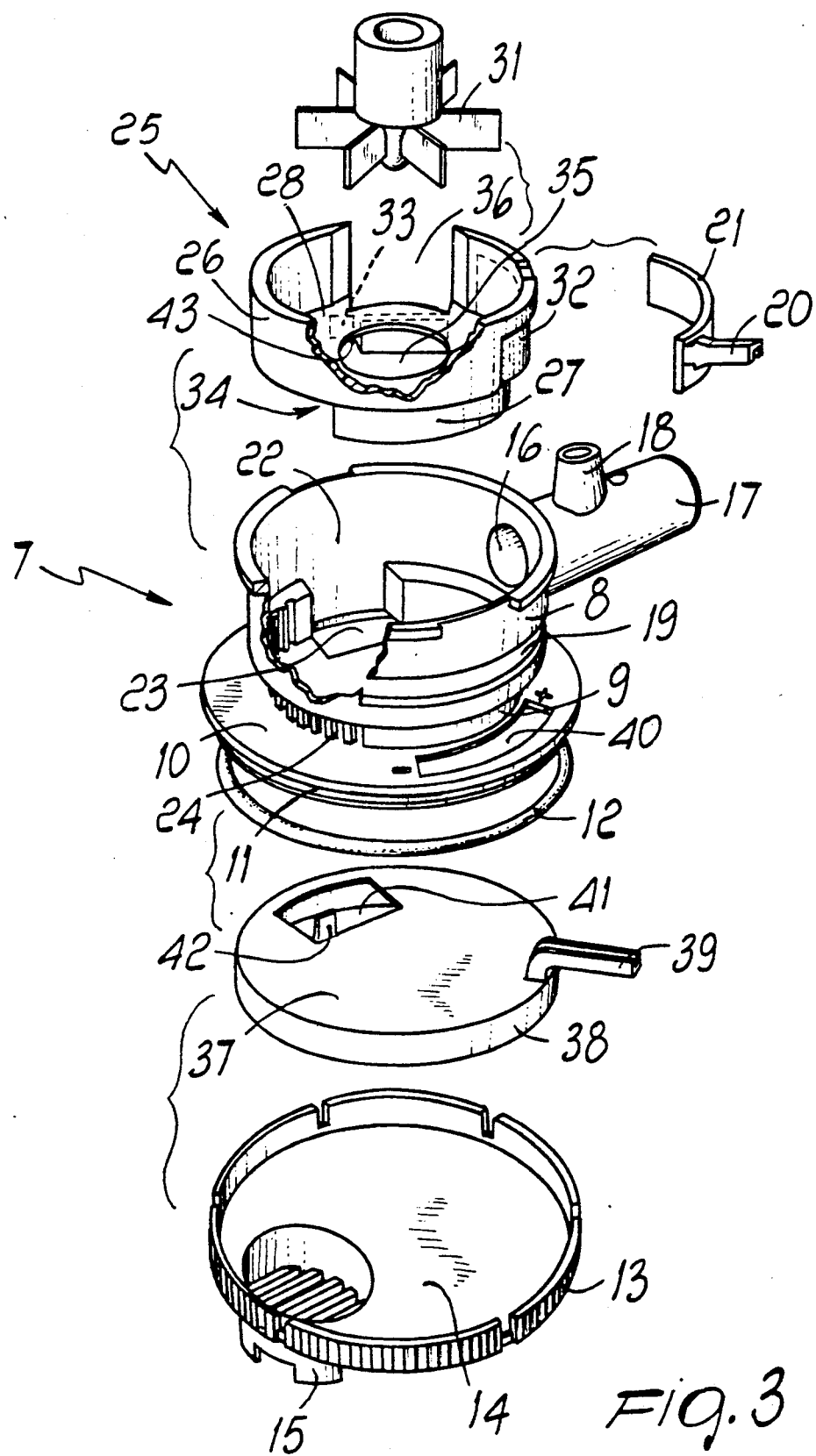
FIG. 3 is an exploded view of the pump of FIG. 2.
Figure 4:
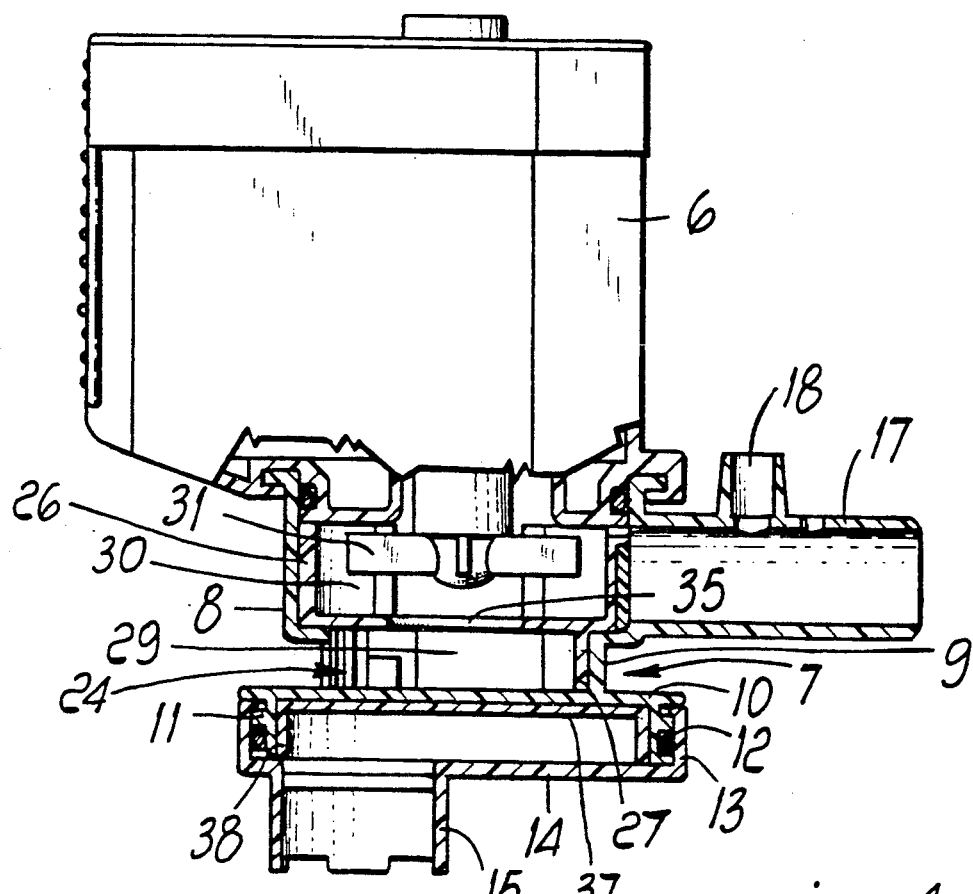
FIG. 4 is a partially sectional side view of the pump according to the invention.
Figure 5:
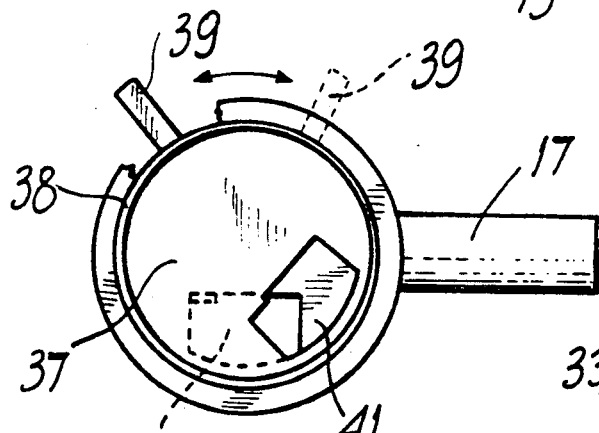
FIG. 5 is a bottom view of a flow-rate throttling device comprised within the pump according to the invention.
Figure 6:
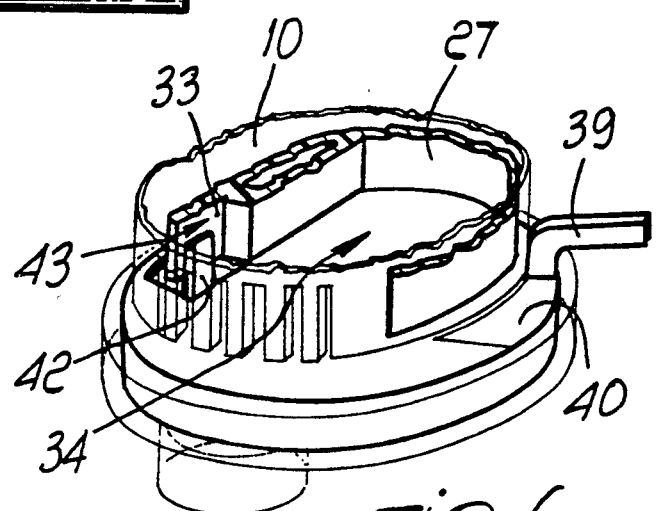
FIG. 6 is a perspective view, in phantom lines, of the device of FIG. 5.

With reference to the above figures, the reference numeral 1 indicates an aquarium set up with a "sand filter" 2 which rests at its base so as to form, below the sand of the bottom, an interspace 3 which is connected, by means of a vertically arranged suction tube 4, to a pump according to the invention, generally indicated by the reference numeral 5.

Said pump 5 comprises a known permanent-magnet water-tight motor unit 6 with which a substantially cylindrical cup-like container 7 is advantageously associated in a downward position by means of a bayonet coupling; said container is composed of a first upper portion 8 which has a larger diameter and by a second lower portion 9 which has a smaller diameter and is downwardly closed by a first disk-like element 10 having a flange-like portion extending inside the lower portion 9 of the container 7.

The flange-like portion of said first disk-like element 10 has, in a downward position, a circular edge 11 on which the seat for an external sealing ring 12 of the 0-ring type is defined; said sealing ring is adapted to be stably inserted inside the knurled edge 13 of a second disk-like element 14 which is complementary thereto and from which a tubular connecting element 15 extends downwardly.

Said cup-like container 7 has, in its first portion 8, a radial port 16 from which a discharge tube 17 and a connection 18 for an aeration tube extend. A slot 19 extends along the wall of the container 7 and is traversed by an actuation member, expediently constituted by a first lever 20 which protrudes outward and extends from a curved laminar element 21 which rests on the inner surface of the container.

Said slot 19 extends in a region which is perpendicular to said port 16 and in a region which is opposite thereto.

Said second portion 9 of the container 7 has an expansion 22 so as to be connected to the wall of the first portion 8.

Advantageously, a quadrangular axial passage port 23 is open below said expansion 22 on the disk-like element 10.

A grilled opening 24 is present on the second portion 9 on the side of the first portion 8 which is opposite to said radial port 16.

According to the invention, inside said cup-like container 7 there is provided an element 25 which is externally shaped complementarily to the internal walls of the container 7. The element 25 is substantially composed of two cylindrical parts 26 and 27 with different diameters, a central disk-like element 28 which interconnects the cylindrical parts 26, 27, and defines a suction chamber 29 inside the second portion 9, and a chamber 30 for the impeller 31, which is rigidly associated with the rotor actuated by the motor unit 6, inside the first portion 8.

Said internal element 25 is slidably coupled to the container 7 and has, on the outer side, an insertion seat 32 for accommodating a curved laminar element 21 rigidly associated with the first lever 20, which thus couples the internal element 25 to the first lever 20.

More in particular, the lower part 27 of the element 25, besides having a cylindrical part, has a planar region 33 the radial plane of symmetry whereof is orthogonal to that of the insertion seat 32; said planar region is adapted for closing the passage between the suction chamber 29 and the expansion 22 of the cup-like container 7, located on the quadrangular passage port 23.

A suction inlet 34 is arranged orthogonally with respect to said planar region 33 on the cylindrical part 27; upon rotation of the element 25, said inlet becomes arranged so as to open the passage between the expansion 22 and the suction chamber 29, which is connected to the chamber 30 by means of a central hole 35, defined on the element 38.

A discharge outlet 36 extends between the lateral wall of the upper cylindrical part 26 and a peripheral portion of the central element 28, at the same radial plane of symmetry of the planar region 33; upon rotation of the element 25, said discharge outlet 36 becomes axially aligned with the radial port 16 of the container 7 and uncovers, by means of its axial part, the port 23 open below the expansion 22.

Still according to the invention, a third disk-like element 37 is enclosed between the edges of the disk-like elements 10 and 14, is rotatably coupled thereto and has a circular edge 38 which keeps it in contact with the first disk-like element 10.

A second lever 39 extends from said third disk-like element 37 and protrudes from a curved slot 40 which is defined on the first disk-like element 10 and has the same plane of symmetry as the one of the first lever 20. The third disk-like element 37 constitutes a flow-rate throttling or regulating element, since it has a passage port 41 which is equal to said quadrangular passage port 23 and is superimposed thereon at one of the two stroke limits of the rotation of the second lever 39.

At the other rotation stroke limit, the passage port 23 is offset with respect to the port 41 and almost completely closed to the passage of water.

A lug 42 extends upward from said third disk-like element 37 through the passage port 23 and is inserted into an angular seat 43, defined inside the planar region 33 of the element 25. Thus, rotation of the third disk-like element 37 in the direction suitable for completely opening the passage port 23 can be effected by moving the first lever 20, to cause a rotation which moves the discharge outlet 36 of the element 25 from the radial port 26 of the container 7 to the passage port 23 thereof.

Figure 7:
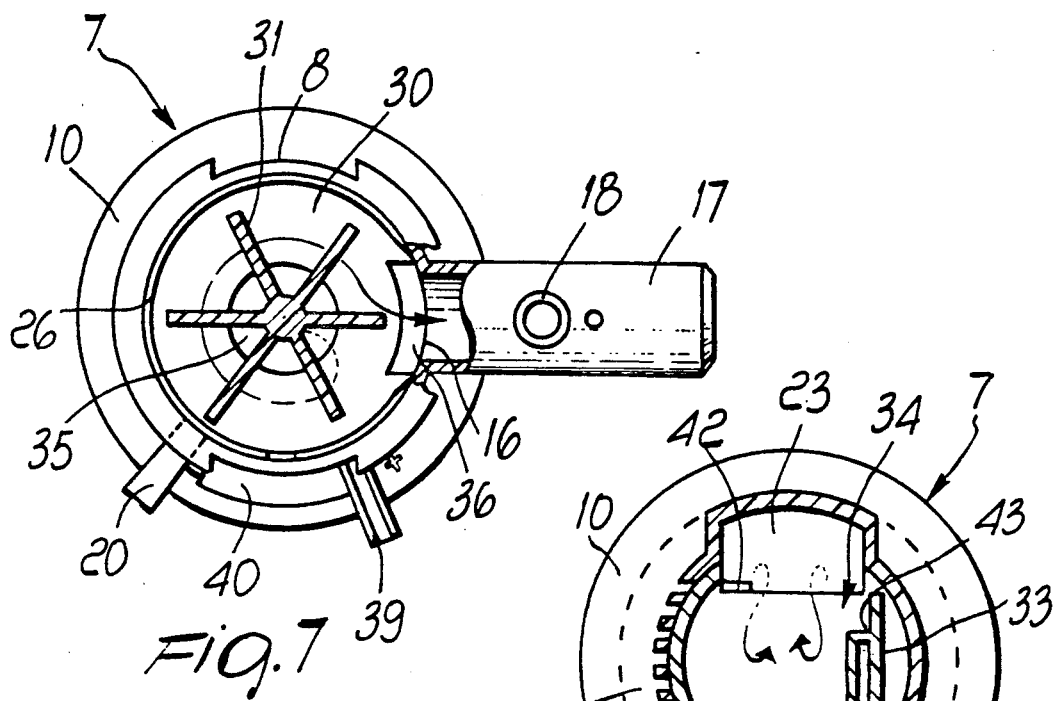
FIG. 7 is a top view of the chamber of the impeller during the normal operation of the pump.
Figure 8:
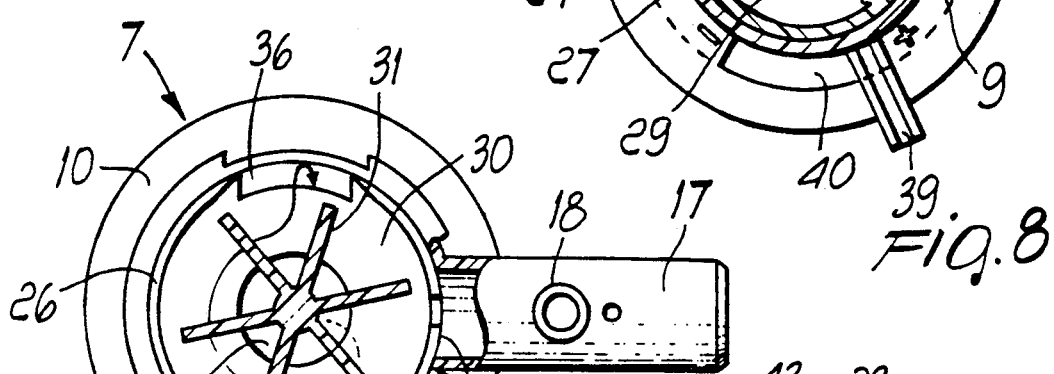
FIG. 8 is a sectional top view of the suction chamber of FIG. 7 during normal operation.

FIGS. 7 and 8 illustrate a first operating mode of the pump according to the invention, with the first lever 20 arranged so that the suction inlet 34 uncovers the passage port 23, connecting the suction tube 4 to the suction chamber 29, and so that the discharge outlet 36 uncovers the passage port 16 which connects the chamber 30 of the impeller 31 to the discharge tube 17.

Figure 9:
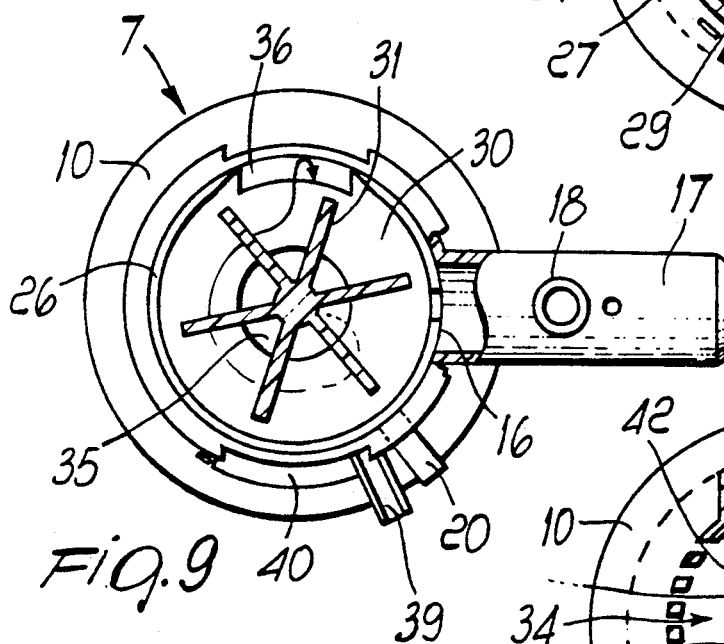
FIG. 9 is a top view of the impeller chamber during operation with reversed flows.
Figure 10:
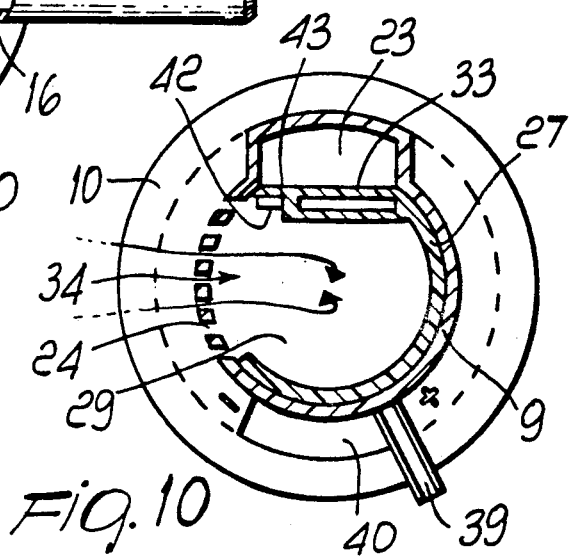
FIG. 10 is a sectional top view of the suction chamber of FIG. 9 during operation with reversed flows.

In this operating mode, the second lever 39 is free to cause the rotation of the third disk-like element 37 to throttle the passage port 23. FIGS. 9 and 10 illustrate the reversed-flow operating mode, in which the first lever 20, which is located at the other side of the slot 19, causes the element 25 to uncover the grilled opening 24 with the suction inlet 34, closing the passage port 23 by means of the planar region 33, and connecting the suction chamber 29 to the outside.

By means of its axial part, the discharge outlet 36 instead connects the chamber 30 to the passage port 23 and thus to the suction tube 4.

During the rotation of the first lever 20 to reverse the flows regardless of the throttling position of the third disk-like element 37, said disk-like element is pushed by means of the angular seat 43 and of the lug 42 so as completely open the passage port 23.

In practice it has thus been observed that the pump according to the invention has achieved the intended aim and object, since by virtue of the simple rotation of two lateral levers it is possible to reverse the flows between the inside of the aquarium and the filter and to adjust the flow-rate so that it can adapt to the characteristics of the filter and of the aquarium.

The possibility of reversing the flows allows to perform periodic cleaning of the filter without acting on the hydraulic connections of the aquarium.

The pump is furthermore made of elements made of plastics obtained by injection molding which can therefore be manufactured in a large number of units at low cost.

By virtue of their particular configuration, the pump elements can be assembled in a simple and rapid manner and can be easily disassembled and reassembled if maintenance operations are required.

The pump according to the invention is naturally suitable for being applied both to a "sand filter" and to any other type of aquarium filter.

The invention thus conceived is susceptible to numerous modifications and variations, all of which are within the scope of the inventive concept.

All the details may furthermore be replaced with other technically equivalent elements.

In practice, the materials employed, as well as the dimensions, may be any according to the requirements.

We claim:

1. Aquarium pump having means for reversing and adjusting the flow of water therethrough and having a permanent-magnet motor unit, said pump comprising a substantially cylindrical container for an internal element, said container being connected to said permanent-magnet motor unit, said internal element defining a lower suction chamber and an upper impeller chamber, said chambers having respectively a suction inlet and a discharge outlet, said internal element being actuated by first lever means and being coupled to the container so as to be rotatable between two positions in which the suction inlet uncovers thereon respectively an axial port and a radial port and the discharge outlet uncovers respectively a radial port and said axial port, a regulator element for regulating the flow of water through said axial port in its operation as suction inlet being connected in a rotatable manner to the container below said suction chamber and being actuated by second lever means.

2. Aquarium pump according to claim 1, wherein said substantially cylindrical container is cup-shaped and has a first portion with a first diameter, a second portion with a diameter which is smaller than said first diameter, and a first lower disk-like element which extends outside said second portion, said first disk-like element having a lower circular edge with a seat for a sealing ring which can be inserted in the circular edge, and a second disk-like element which is rigidly connected to the first disk-like element, a tubular connecting element being furthermore provided which protrudes from said second disk-like element in a direction opposite from said first disk-like element.

3. Aquarium pump according to claim 2, wherein said axial port defined on the container is constituted by a quadrangular passage port which opens on said disk-like element and extends at a portion of said second portion which connects it to the wall of said first portion.

4. Aquarium pump according to claim 1 wherein said internal element is accommodated in said container and has an upper substantially cylindrical part with a first diameter, a substantially cylindrical lower part with a diameter which is smaller than said first diameter, and a disk-like central connecting element.

5. Aquarium pump according to claim 4, wherein said suction inlet is provided on said substantially cylindrical lower part of said internal element, said discharge outlet being located on the substantially cylindrical upper part, said discharge outlet being composed of a radial portion and of an axial portion which extends on said central element, an axial hole defined on said central element connecting the two chambers which are defined inside said container.

6. Aquarium pump according to claim 4, wherein an insertion seat for a curved laminar element is defined on the substantially cylindrical upper part of said internal element, said laminar element being interposed between said internal element and the wall of said container, a first lever extending from said curved laminar element and being slidable in a slot defined on the wall of said container.

7. Aquarium pump according to claim 1, wherein said radial port covered by said suction inlet is constituted by a grilled slot present in a second smaller-diameter portion of said container in a position which is orthogonal to said axial port.

8. Aquarium pump according to one claim 1, wherein said radial port opened by said discharge outlet is constituted by a coupling hole for a discharge tube which extends from the first larger-diameter portion of said container in a position which is opposite to that of the radial port opened by said suction inlet.

9. Aquarium pump according to claim 1 wherein said regulator element is constituted by a third disk-like element which is located in a chamber which is formed between said first two disk-like elements, said third disk-like element having a circular edge which keeps in contact with the first disk-like element and a passage port which is identical to said suction inlet, a second lever extending from said third disk-like element and protruding from a curved slot which is defined on said first disk-like element.

10. Aquarium pump according to claim 9, wherein a lug extends upward from said third disk-like element and accomodates in an angular seat defined in said planar region of said lower part of said internal element, said angular seat coupling said third disk-like element to rotate together with said internal element in the rotation which reverses the flow of the pump to completely open said axial port during reversed-flow operation.

* * * * *